United States Patent Office 3,482,463
Patented Dec. 9, 1969

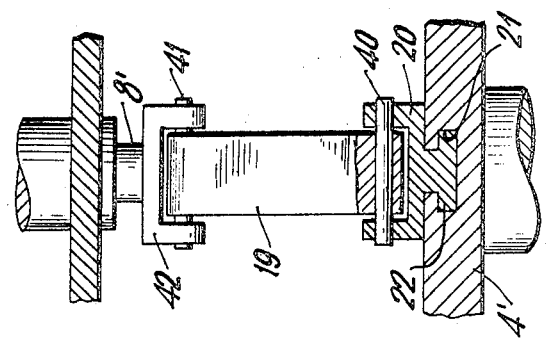
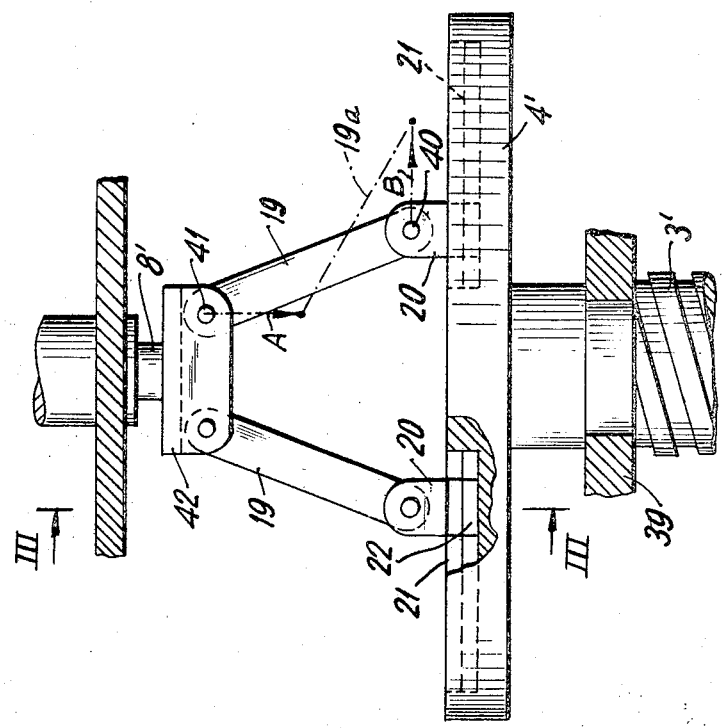

3,482,463
DRIVING MECHANISM FOR SPINDLE PRESSES AND THE LIKE
Eduard Huydts, Dusseldorf-Gerresheim, and Helmut Dischler, Neuss-Udesheim, Germany, assignors to Maschinenfabrik Hasenclever AG, Dusseldorf, Germany, a corporation of Germany
Filed Feb. 16, 1968, Ser. No. 706,101
Claims priority, application Germany, Feb. 18, 1967, M 72,823
Int. Cl. F16h 1/20
U.S. Cl. 74—424.8      12 Claims

ABSTRACT OF THE DISCLOSURE

A machine-tool spindle is mounted coaxially with a leadscrew of smaller diameter which is axially reciprocable, by hydraulic or pneumatic fluid, with reference to a mating nut, either the nut or the leadscrew being rigid with the spindle to convert their relative reciprocations into alternate rotation of the spindle in opposite directions, with or without axial displacement of the spindle itself.

---

Our present invention relates to a machine tool of the type having a rotatable spindle.

In several commonly assigned applications now pending (Ser. No. 584,269, filed Dec. 18, 1967 by Harold Hany now Patent No. 3,389,653; Ser. Nos. 550,208 and 581,616, filed May 16, 1966 and Sept. 23, 1966 by Harold Hany and Volker Stille now Patent Nos. 3,418,859 and 3,418,860, respectively) there have been disclosed spindle presses in which a ram is axially reciprocated by a threaded spindle rotatably held in an axially fixed nut; the spindle is alternately rotated in opposite directions by frictional contact with a pair of driving disks positioned on opposite sides thereof.

An object of our present invention is to provide a machine tool of this general type in which the need for a friction drive is eliminated, with resulting reduction of wear and avoidance of the need for periodic compensatory readjustment.

Another object of this invention is to provide means in such machine tool for substantially insulating the spindle drive from the reaction forces exerted by a workpiece shaped by a spindle-entrained ram.

It is also an object of this invention to provide a highly compact assembly for the reciprocating rotation of a machine-tool spindle, wtih or without axial displacement thereof, by pneumatic or hydraulic means.

These objects are realized, pursuant to our present invention, by the provision of a two-member assembly for converting axial thrust into rotary motion of an associated spindle which is coupled with one of these members for joint rotation therewith, one member being a leadscrew coaxial with the spindle, the other member being a mating nut. Depending on the type of coupling employed, the spindle may or may not partake of the axial reciprocation of its driving member, e.g., the leadscrew. Thus, if no axial shift of the spindle is desired, the coupling may take the form of an extensible torque-transmitting linkage; in a spindle press used for impact deformation of workpieces, on the other hand, such linear motion is useful since it is communicated to a reciprocable ram engaged by the spindle. In the latter instance it is particularly advantageous to make the spindle diameter larger than the leadscrew diameter and to provide the spindle with a thread whose pitch angle is correspondingly smaller than that of the leadscrew thread so that both threads have the same pitch; as the spindle revolves within its own nut in unison wtih the coaxial leadscrew, the driving torque is supplied by the leadscrew but the reaction force from the impingement of the ram upon a workpiece is taken up by the machine frame carrying the spindle nut.

In a particularly compact arrangement according to the invention, the spindle has an axial bore accommodating both the leadscrew and its nut, the latter being fixed with reference to the spindle; a tube passing axially through the leadscrew delivers fluid under pressure to one portion of the spindle bore, adjacent a closed end of that bore, for relatively displacing the leadscrew and the spindle in one axial direction, such fluid being alternately admitted into another bore portion via a clearance between the tube and the leadscrew for exerting an axial thrust in the opposite direction.

The invention will be described in greater detail hereinafter with reference to the accompanying drawing in which:

FIG. 2 is a fragmentary elevational view of a modified press generally similar to that of FIG. 1;

FIG. 3 is a cross-sectional view taken on the line III—III of FIG. 2; and

Figure 1:
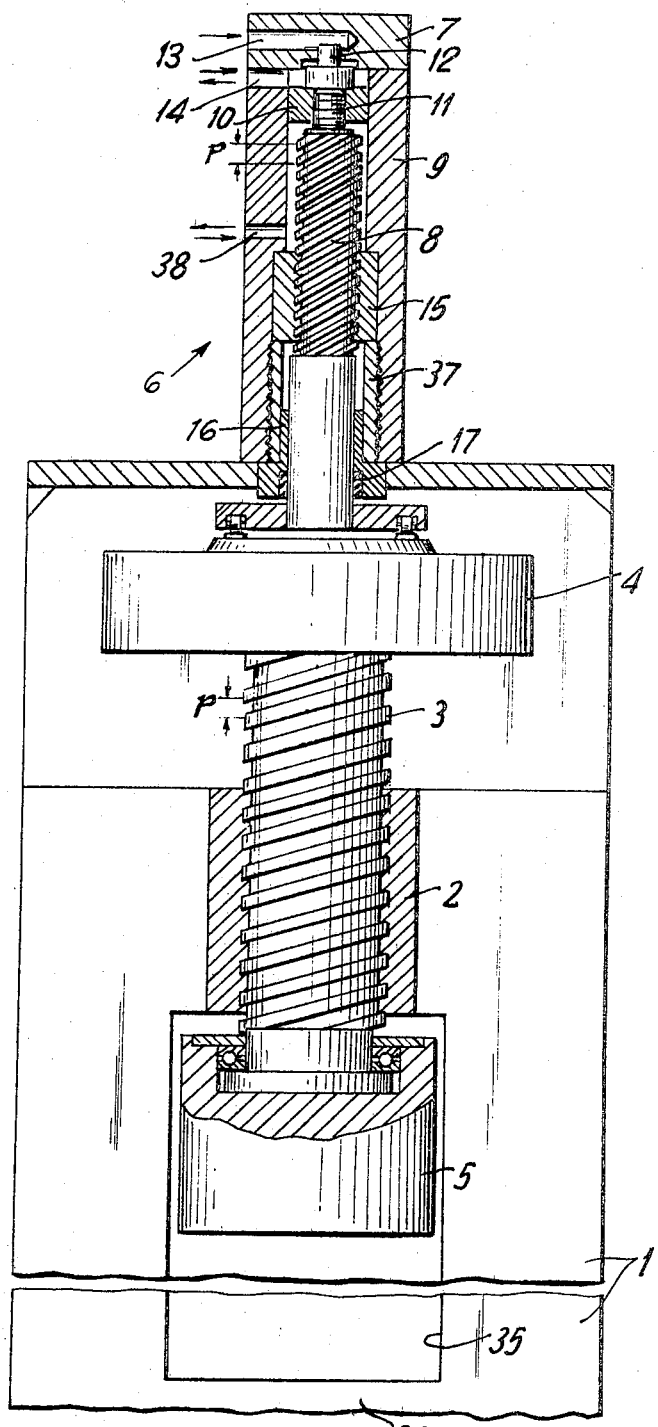
FIG. 1 is an elevational view, in axial section, of a spindle press embodying the present invention.

The machine tool shown in FIG. 1 comprises a press frame 1 rigid with a nut 2 which is matingly transversed by a vertical spindle 3, the lower end of the spindle being rotatably journaled in a ram 5 which is slidably guided in a pair of cutouts 35 (only one shown) of frame 1 for operating upon a workpiece carried on the bed portion 36 of the frame. Spindle 3 is integral with a flywheel 4 through which it is coupled, for joint rotation and axial reciprocation, with a leadscrew 8 forming part of a thrust-converting assembly 6, this assembly including a cylindrical housing 9 within which a nut 15 engaged by the leadscrew is fixedly held with the aid of a threaded sleeve 37. Cylinder 9 is capped by a head 7 containing a channel 13 which communicates with a source of high-pressure fluid bearing upon a pin 12 which acts as a shock absorber when stopping the leadscrew 8 at the upper end of its stroke; a piston 10, rigidly mounted on an extension 11 of the leadscrew, is alternately subjected to downward and upward pressure from an operating fluid, such as hydraulic oil, admitted through a port 14 and exhausted through a port 38 or vice versa.

The thread of leadscrew 8, whose diameter is less than that of spindle 3, is steeper than that of the spindle so that both have the same pitch $p$. Thus, the thrust of the working fluid in cylinder 9 is translated into a rotary motion of unit 3, 4, 8 which at the same time axially advances a distance $p$ per revolution, thereby driving the ram 5 at the same rate. The reaction force exerted by the workpiece upon the ram is absorbed primarily by the frame structure 1 so that the cylinder 9 need only resist the stress exerted by the operating fluid. This fluid is allowed to lubricate the mating threads of the leadscrew 8 and nut 15, the space below the nut being sealed against the atmosphere by means of a stationary bushing 16 contacting an unthreaded lower extension of leadscrew 8 through a packing ring 17.

In FIGS. 2 and 3 we have shown a spindle 3' held against axial displacement by a part 39 of the machine frame. A disk 4', which may also act as a flywheel, is formed with a plurality of radial tracks 21 in the shape of mortised grooves, the latter being engaged by corresponding tenons 22 integral with brackets 20 which are thus slidably guided across the upper face of the disk and are hinged by pins 40 to links 19 which in turn are articulated at 41 to another bracket 42 rigid with leadscrew 8'. Thus, upon an axial descent of the leadscrew as indicated by arrow A, the sliders 20 move outwardly (arrow B) so that the links 19 assume a more inclined position as illustrated at 19a. The compound motion of leadscrew 8' is thereby translated into a pure rotation of spindle 3' which in turn may be used for the axial reciprocation of a load, not shown, threadedly engaging the spindle, such as a nut rigid with the ram 5 of FIG. 1. In this case, the threads of the spindle 3' and the leadscrew 8' may have any desired pitch ratio which in turn will determine the length of the stroke of the load; this stroke, therefore, may be larger or smaller than that of the leadscrew.

Figure 4:
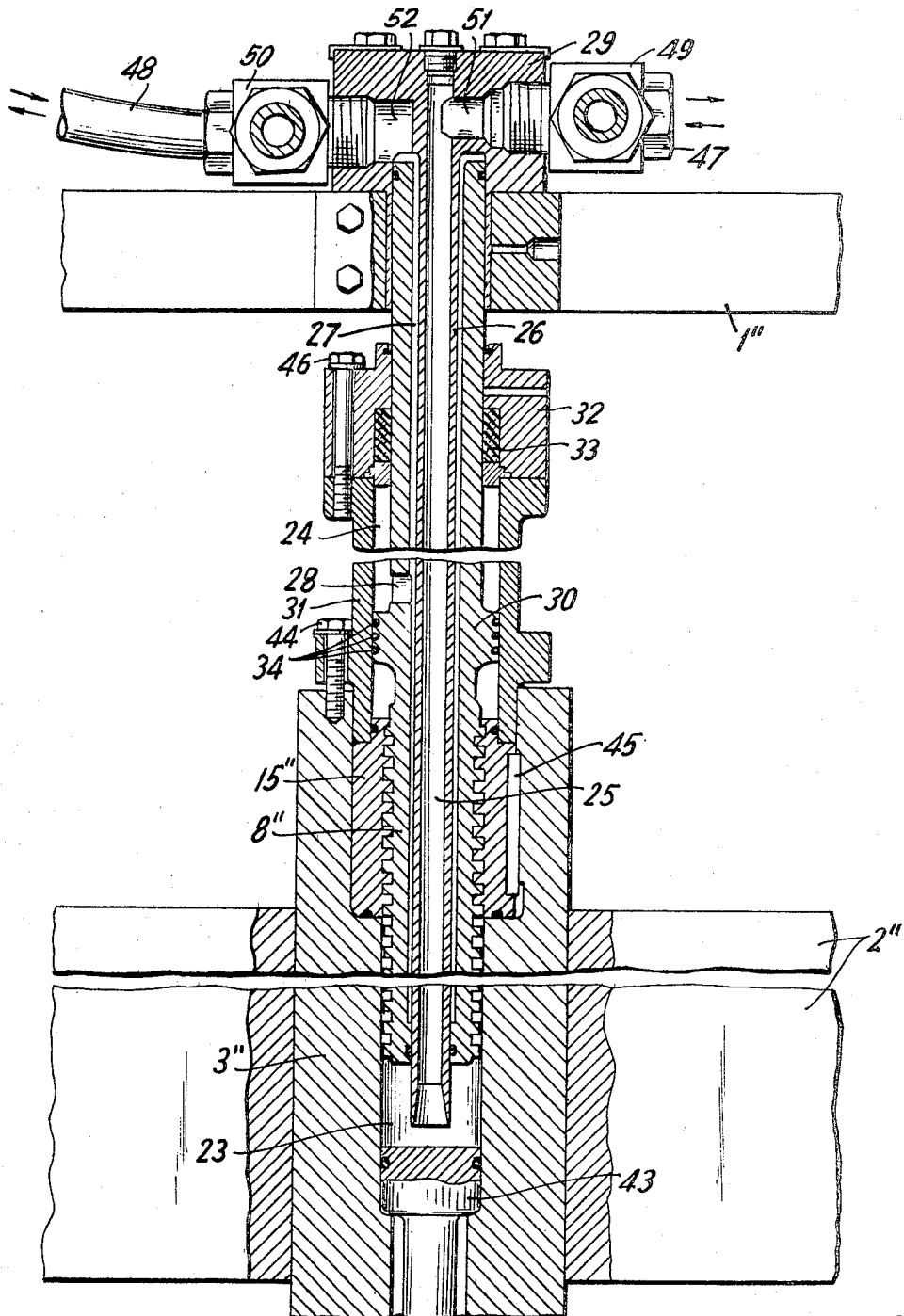
FIG. 4 is a view similar to FIG. 1, illustrating a further embodiment.

In FIG. 4 we have illustrated a spindle press whose spindle 3" is formed with an axial bore having a terminal portion 23 closed by a plug 43. A leadscrew 8" is non-rotatably suspended from machine frame 1" and projects into the spindle bore, terminating short of the plug 43 in the top position of the spindle 3" and its flywheel 2" as determined by external stops not shown. Leadscrew 8" is also hollow and has a throughgoing axial passage traversed by a feed tube 26 which, except at the lower end of the leadscrew, extends through this passage with all-around clearance 27. A side aperture 28 in leadscrew 8" connects the clearance 27 with another portion 24 of the spindle bore formed between the leadscrew 8" and a surrounding sleeve 31 which constitutes an upward extension of the spindle body and is removably held onto it by screws 44 (only one shown); a nut 15" mating with leadscrew 8" is held in position by sleeve 31 within a recess at the upper end of spindle body 3" to which it is nonrotatably secured by a key 45. The top of bore portion 24 is closed by a collar 32 making fluidtight contact, through the intermediary of a packing 33, with an unthreaded upward extension of the leadscrew; collar 32 is detachably secured to sleeve 31 by means of screws 46 (only one shown).

Leadscrew 8" is formed with an outer annular shoulder 30 which is held in fluidtight contact with sleeve 31 by means of piston rings 34 so as effectively to constitute a piston head. Conduits 47 and 48 are connected through couplings 49, 50 with a distributor head 29 at the top of frame 1", this head having a first port 51 connecting the conduit 47 with the central passage 25 of tube 26 and a second port 52 connecting the conduit 48 with the annular clearance 27 surrounding that tube. Thus, alternate admission of high-pressure fluid to conduits 47 and 48, with the concurrent venting of the opposite conduit, will alternately generate pressure in bore portions 23 and 24 to lower and to raise the spindle assembly 3", 31, 32 with reference to the axially stationary and nonrotatable leadscrew 8", with accompanying rotation of this spindle assembly together with nut 15" and flywheel 2".

If desired, spindle 3" may again be externally threaded in mating engagement with either a fixed or an axially movable nut, the pitch of the spindle in the former case being necessarily made equal to that of leadscrew 8".

We claim:
1. In a machine tool, in combination:
a spindle rotatable about an axis;
a two-member assembly for converting axial thrust into rotary motion about said axis, one of the members of said assembly being a leadscrew coaxial with said spindle, the other member of said assembly being a nut matingly engaging said leadscrew, said nut and said leadscrew being mounted with freedom of relative linear reciprocation along said axis;
drive means for relatively reciprocating said nut and said leadscrew along said axis while holding one of said members against rotation, thereby rotating the other of said members about said axis;
and coupling means linking said other of said members with said spindle for joint rotation.

2. The combination defined in claim 1 wherein said spindle is threaded with the same pitch as said leadscrew but is of larger diameter than the latter, further comprising an axially fixed second nut matingly engaging the threads of said spindle, said spindle and said leadscrew being interconnected by said coupling means for joint axial displacement.

3. The combination defined in claim 1, further comprising a flywheel mounted at an end of said spindle, said coupling means joining said leadscrew to said flywheel.

4. The combination defined in claim 1 wherein said spindle is provided with mounting means for holding same against axial displacement, said coupling means including a torque-transmitting linkage of variable axial extent.

5. The combination defined in claim 4 wherein said linkage includes a disk with a plurality of radial tracks, sliders engaging said tracks and a plurality of arms respectively hinged to said sliders.

6. The combination defined in claim 5 wherein said disk is a flywheel rigid with said spindle.

7. The combination defined in claim 1 wherein said spindle has an axial bore containing said nut, said leadscrew traversing said bore.

8. The combination defined in claim 7 wherein said leadscrew is provided with a throughgoing axial passage and with a lateral aperture communicating with said passage and with a first portion of said bore, further comprising a tube extending through said passage with lateral clearance and terminating beyond said leadscrew in a second portion of said bore adjacent a closed end thereof, said leadscrew having an external shoulder positioned in said bore between said first and second portions thereof, said drive means including a distributor connected to a source of pressure fluid for alternately admitting such fluid to said clearance and to the interior of said tube with consequent relative axial reciprocation of said leadscrew and said spindle.

9. The combination defined in claim 8 wherein said spindle comprises an elongate body with a recessed end receiving said nut, a sleeve extending outwardly from said end and a collar secured to said sleeve in fluidtight contact with said leadscrew, said sleeve being spaced from said leadscrew and defining therewith said first portion of said bore, said shoulder being in fluidtight contact with said sleeve.

10. The combination defined in claim 1 wherein said drive means comprises a cylinder surrounding said leadscrew and a piston rigid with said leadscrew in said cylinder, the latter being provided with ports for the admission of a working fluid under pressure to opposite faces of said piston.

11. The combination defined in claim 10 wherein said cylinder is provided with a fluid-biased end stop for cushioning the impact of said piston and leadscrew in a terminal position thereof.

12. The combination defined in claim 10 wherein said nut is received in said cylinder at a location beyond said ports, said working fluid being a liquid adapted to lubricate the mating threads of said leadscrew and said nut, said cylinder being provided with packing means beyond said nut for preventing the leakage of said working fluid from the cylinder.

References Cited
UNITED STATES PATENTS

| | | | |
|---|---|---|---|
| 2,081,917 | 6/1937 | Gartin | 74—424.8 |
| 2,688,951 | 9/1954 | Sears. | |
| 2,790,478 | 4/1957 | Shapiro | 100—289 X |
| 3,403,365 | 9/1968 | Richards | 74—424.8 X |

LEONARD H. GERIN, Primary Examiner

U.S. Cl. X.R.

100—289